United States Patent [19]

Kuznetsov

[11] Patent Number: 5,433,149
[45] Date of Patent: Jul. 18, 1995

[54] COMPOSITE REACTION MEMBER FOR LATERAL GUIDANCE AND LEVITATION CONTROL OF PARELLEL ELECTRICALLY CONDUCTIVE AND FERROMAGNETIC STRIPS

[75] Inventor: Stephen B. Kuznetsov, Washington, D.C.

[73] Assignee: Power Superconductor Applications Company, Pittsburgh, Pa.

[21] Appl. No.: 80,074

[22] Filed: Jun. 18, 1993

[51] Int. Cl.⁶ .............................................. B60L 13/06
[52] U.S. Cl. .................................... 104/284; 104/286
[58] Field of Search ................ 104/281, 284, 285, 286

[56] References Cited

U.S. PATENT DOCUMENTS

| | | | |
|---|---|---|---|
| 3,717,103 | 2/1973 | Guderjahn | 104/285 |
| 3,834,318 | 9/1974 | Fellows et al. | 104/286 X |
| 3,967,561 | 7/1976 | Schwarzler | 104/286 X |
| 4,064,808 | 12/1977 | Nakamura et al. | 104/286 |
| 4,646,651 | 3/1987 | Yamamura et al. | 104/286 X |
| 5,085,149 | 2/1992 | Huson | 104/286 X |
| 5,222,436 | 6/1993 | Coffey | 104/286 X |

*Primary Examiner*—Robert J. Oberleitner
*Assistant Examiner*—S. Joseph Morano
*Attorney, Agent, or Firm*—Ansel M. Schwartz

[57] ABSTRACT

An electrodynamic levitation system for moving from one location to another location. The system comprises a vehicle. The system also comprises a guideway along which the vehicle travels. Additionally, the system comprises a propulsion mechanism for moving the vehicle. At least a first portion of the propulsion mechanism is in contact with the vehicle and at least a second portion of the propulsion mechanism is in contact with the guideway. The system also comprises mechanism for controlling lateral guidance levitation of the vehicle with respect to the guideway as the vehicle travels along the guideway. At least a first portion of the controlling mechanism is in contact with the vehicle and at least a second portion of the controlling mechanism is in contact with the guideway. The present invention also pertains to a levitation and guidance element for an electrodynamically suspended maglev vehicle. The element comprises an electrically conductive levitation and guidance strip. The element also is comprised of a ferromagnetic lateral guidance strip in contact with and in parallel with the levitation and guidance strip. In a preferred embodiment, the levitation and guidance strip has a width, and the lateral guidance strip has a width which is less than the width of the levitation and guidance strip.

6 Claims, 6 Drawing Sheets

COMPOSITE REACTION MEMBER FOR LATERAL GUIDANCE AND LEVITATION CONTROL OF PARELLEL ELECTRICALLY CONDUCTIVE AND FERROMAGNETIC STRIPS

FIELD OF THE INVENTION

The present invention is related to electrodynamic levitated systems. More specifically, the present invention is related to an electrodynamically levitated system having a levitation and guidance element.

BACKGROUND OF THE INVENTION

Conventional electrodynamic suspension (EDS) of magnetically-levitated (maglev) vehicles utilize air-core magnetics consisting of a superconducting field magnet system with lift magnets arranged longitudinally along each vehicle side, interacting with a guideway mounted conducting strips mounted on both sides of guideway and composed of high conductivity material such as aluminum strip or aluminum ladder. In prior art maglev systems, both guideway and vehicle suspension components are without ferromagnetic material. The vehicle levitation system provides a minor degree of lateral stabilization and must be aided by a separate and dedicated lateral guidance array of magnets operated in a null-flux mode to provide sufficient stabilizing force and stiffness/damping for a full scale vehicle. The existing technology is limited in the respect that the lateral stabilization provided by the main suspension (lift) magnets is too low to be effective and usually less than 20% of the magnitude of the null-flux stabilization and second, it is heavily speed dependent and consequently has no useful lateral stabilization at the low speed range.

SUMMARY OF THE INVENTION

The present invention pertains to an electrodynamic levitation system for moving from one location to another location. The system comprises a vehicle. The system also comprises a guideway along which the vehicle travels. Additionally, the system comprises propulsion means for moving the vehicle. At least a first portion of the propulsion means is in contact with the vehicle and at least a second portion of the propulsion means is in contact with the guideway. The system also comprises means for controlling lateral guidance levitation of the vehicle with respect to the guideway as the vehicle travels along the guideway. At least a first portion of the controlling means is in contact with the vehicle and at least a second portion of the controlling means is in contact with the guideway under the vehicle's travel.

The present invention also pertains to a levitation and guidance element for an electrodynamically suspended maglev vehicle. The element comprises an electrically conductive levitation and guidance strip. The element also is comprised of a ferromagnetic lateral guidance strip in contact with and in parallel with the levitation and guidance strip.

In a preferred embodiment, the levitation and guidance strip has a width, and the lateral guidance strip has a width which is less than the width of the levitation and guidance strip.

BRIEF DESCRIPTION OF THE DRAWINGS

In the accompanying drawings, the preferred embodiment of the invention and preferred methods of practicing the invention are illustrated in which.

DESCRIPTION OF THE PREFERRED EMBODIMENT

Figure 1:
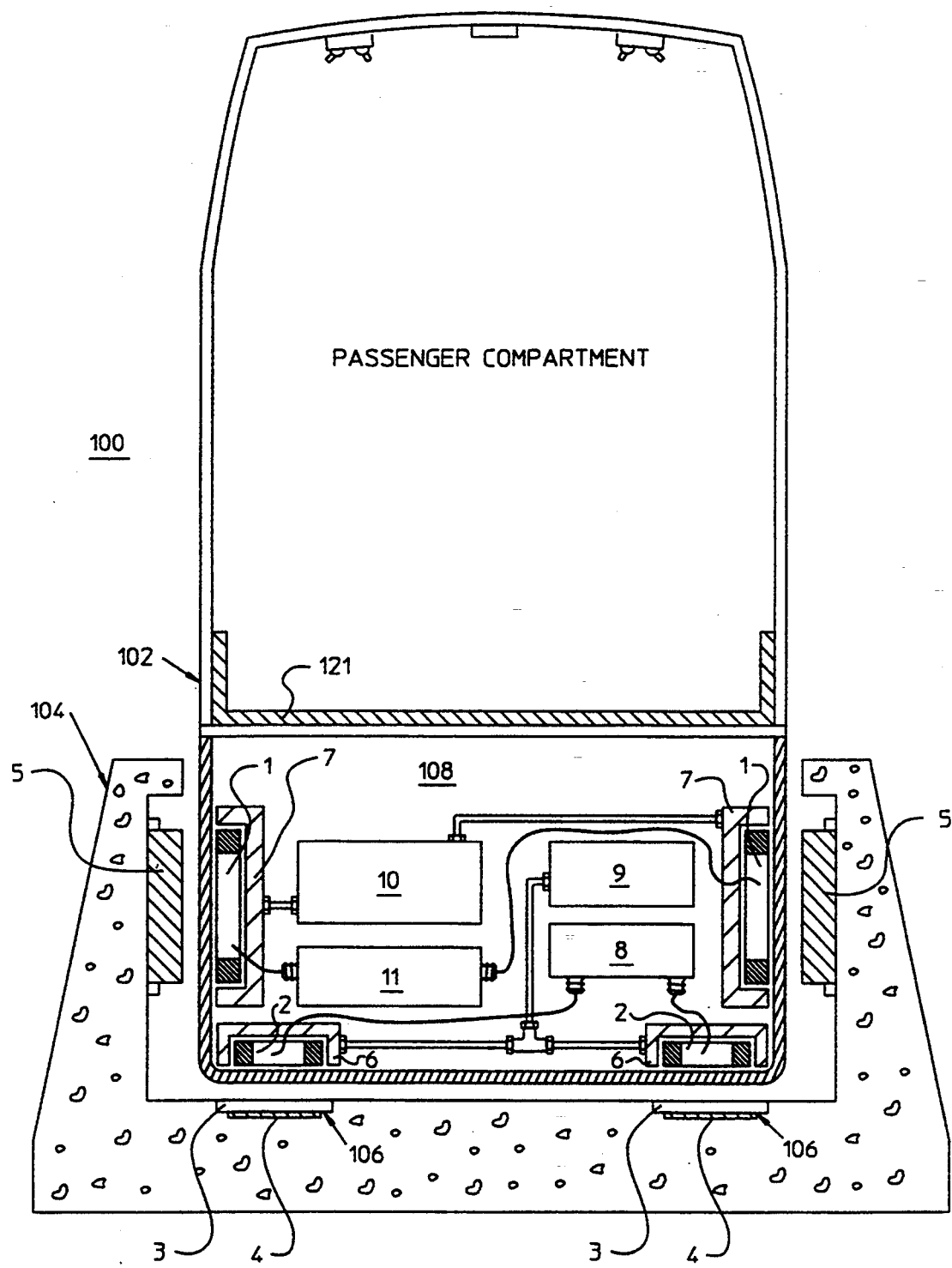
FIG. 1 is a schematic representation of an electrodynamic levitation system for moving from one location to another location of the present invention.

Referring now to the drawings wherein like reference numerals refer to similar or identical parts throughout the several views, and more specifically to FIG. 1 thereof, there is shown a schematic representation of an electrodynamic levitation system 100 for moving from one location to another location. The system 100 is comprised of a vehicle 102. The system 100 is also comprised of a guideway 104 along which the vehicle 102 travels. The system 100 is also comprised of propulsion means for moving the vehicle 102. At least a first portion of the propulsion means is in contact with the vehicle 102 and at least a second portion of the propulsion means is in contact with the guideway 104.

Preferably, the first portion of the propulsion means is comprised of a guideway mounted linear synchronous motor stator assembly 5. Preferably, the second portion of the propulsion means is comprised of a linear synchronous motor propulsion field coil 1 which is connected to an onboard refrigerator/liquifier for cryogen circuit 10 and the onboard power supply 11 which feeds the linear synchronous motor field coils 1. The propulsion field coils 1 are preferably disposed in a cryostat or thermal-mechanical enclosure 7 for the superconducting linear synchronous motor field coils 1.

The system 100 is also comprised of means for controlling lateral guidance levitation of the vehicle with respect to the guideway as the vehicle travels along the guideway. At least the first portion of the controlling means is connected to the vehicle 102 and at least a second portion of the controlling means is connected to the guideway 104 underneath the vehicle's travel. Preferably, the first portion of the controlling means is comprised of a levitation superconducting vehicle mounted field coil 2 connected to a power supply 8 for the superconducting levitation coils 2. The superconducting levitation coils 2 are disposed in a cryostat or thermomechanical enclosure 6. The enclosure 6 is connected to an onboard refrigerator/liquifier 9 for cryogen for the superconducting levitation field coils 2. The second portion is preferably comprised of a levitation and guidance element 106. The element 106 is comprised of an electrically conductive levitation and guidance strip or ladder 3. The element 106 is also comprised of a ferromagnetic lateral guidance strip 4 in contact with and in parallel with the levitation and guidance strip 3. Preferably, the ferromagnetic lateral guidance strip 4 is positioned underneath the electrically conductive levitation and guidance strip 3. The levitation and guidance strip 3 preferably has a width, and the lateral guidance strip 4 preferably has a width which is less than the width of the levitation and guidance strip 3.

The first portion of the propulsion means and the first portion of the controlling means is preferably located in a base 108 of the vehicle 102. About the base 108 is preferably the compartment 12 1 passengers, objects, etc.

The present invention of a mixed-magnetic permeability (mixed-mu) EDS using high-field superconducting magnets advances the state of the art by providing 2 key features which improve the overall vehicle suspension system and provide a substantial ancillary lateral stabilization mechanism to strongly augment conventional null-flux lateral guidance systems. The first feature is the resulting magnetic field distribution at the guideway surface vehicle which provides a speed independent lateral positive restoring force equal to approximately one-half (50%) of the null-flux force, including zero speed operation and up to 150 m/s vehicle speed. The described force uses a different force principle based on the square of the magnetic flux density at the guideway levitation strip surface. This is coupled with a higher lateral stiffness (dFy/dy) than single-mu EDS systems with the exact width of the secondary member controlling the range of high lateral stiffness and applicable force distribution. The second broad feature of the mixed-mu EDS is the ability to more closely concentrate the impinging magnetic field created by the vehicle SC magnet array, boosting flux density at the specific secondary electrical member and lowering the ambient or stray magnetic field underneath the guideway and on both sides, to conform better to environmental standards and to better utilize expensive guideway conducting materials. By contrast, single-mu air-core prior-art EDS systems have very high stray magnetic field at the guideway.

Figure 2A:
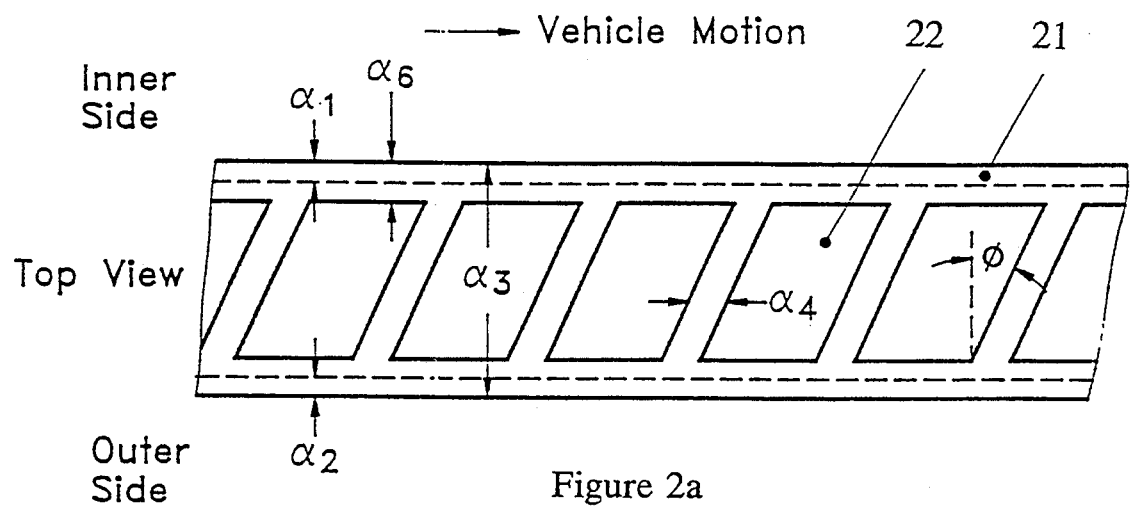
FIG. 2a is an overhead view of the levitation and guidance element for an electrodynamically suspended maglev vehicle of the present invention.
Figure 2B:
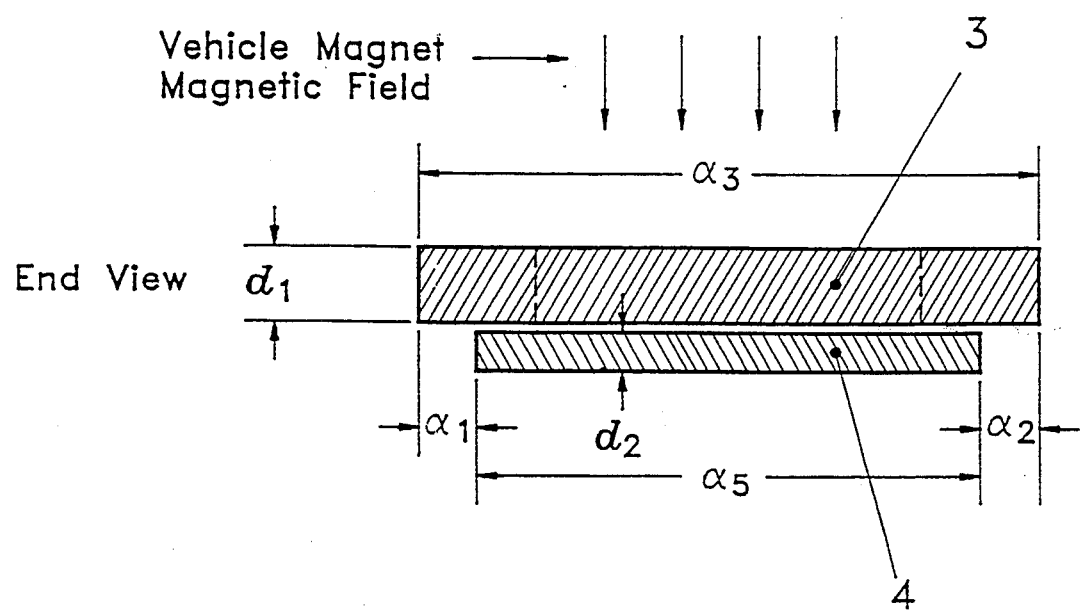
FIG. 2b is an end view of the levitation and guidance element.

FIG. 1 shows a view of the mixed-mu EDS wherein the vehicle contains a high-field superconducting magnet array, usually arranged as a dual system for constructional and operational convenience, with 100% air-core vehicle magnetics. The vehicle magnets are dipoles, longitudinally oriented and located on the undercarriage of the vehicle and may be arranged in alternating polarity and of an odd number per side such as seven i.e. N-S-N-S-N-S-N. Even number arrays are possible although provide a somewhat higher levitation drag force at high or medium speeds. Although the present invention covers the entire range of vehicle sizes and mass loadings, it is worth noting typical design parameters for a large maglev vehicle of weight 67 tons when fully loaded. A system of 7 S.C. magnets per vehicle side is provided, an electromagnetic airgap of 22 cm between magnets and guideway surface, and magnet excitation is calculated to be a minimum of 285 kAT/-magnet with units which are 1.5 m. long and 0.35 m. wide for active coil area. It is essential to note that the vehicle superconducting field is three dimensional and at the magnet internal conductor winding the peak magnetic field will be typically 5.0–5.5 Tesla. The large airgap results in a substantial attenuation of magnetic field once the density is measured at the surface of the maglev guideway and is in all cases less than 2.25 Tesla when airgaps in the range of 18–28 cm are considered, which are of primary interest to the commercial development of the art. That is the field attenuation is a minimum of 2:1 from vehicle to guideway and in designs with a lower magnet pole pitch or width, the attenuation is a 3:1 or 4:1 ratio. This indicates that using the best available superconducting materials such as niobium-titanium (Nb—Ti) and limiting vehicle magnet density to 5.5 Tesla, the resultant guideway field of 2.25 Tesla maximum is at or below the saturation magnetic field density of ferromagnetic guideway materials and therefore there is advantage to utilizing ferromagnetic steel guideway magnetic members in the secondary circuit. FIG. 1 shows the general view of the present invention and FIGS. 2a and 2b details the construction of the secondary track member comprising a mixed-mu system with relative dimensions appropriate for levitation and lateral stabilization of a high speed maglev vehicle over a range of speeds: 0 to 325 mph. With reference to FIGS. 2a and 2b, the following labels are defined:

21. Levitation strip high conductivity material and relative permeability, $U_r=1$ side bar or longitudinal conductor.
22. Open-space or void in between each rung member 3.
3. Levitation strip high conductivity material and relative permeability, $U_r=1$ lateral oriented rungs or main path conductors of longitudinal dimension $a4$.
4. Ferromagnetic secondary circuit material of permeability $U_r>1$ located underneath items 1 and 3 comprising the mixed-mu system and flux concentrating member.

$a_1$ = lateral offset between lateral overhang of main sidebar conductor (21) and edge of ferromagnetic plate (4) on inner side.
$d_1$ = Thickness of upper conducting member.
$d_2$ = Thickness of lower ferromagnetic member.
$a_2$ = Lateral offset between lateral overhang of main sidebar conductor (21) and edge of ferromagnetic plate (4) on outer side of guideway.
$a_3$ = Overall lateral width of main conducting levitating strip of permeability $U_r=1$.
$a_4$ = Active width, mostly in longitudinal direction of levitation ladder main conductor item 3.
$a_5$ = Overall lateral dimension of ferromagnetic back plate $\theta_2$ = angle of inclination of levitation ladder main rungs with respect to perfectly square orientation or rungs.
$a_6$ = Lateral width of an innermost conducting sidebar.

The special features of this configuration are:

The $a_1$ dimension is not necessarily equal to the $a_2$ dimension and if $a_1 \neq a_2$ then there exists at all speeds a differential in the lateral restoring force which can be beneficially used to assist in vehicle lateral centering. For example, it is desirable to have an inward traveling net lateral force, then this is accomplished by having $a_1 > a_2$ but not to exceed the dimension of $a_6$ for the relative differences in dimension. The present invention utilizes an electromagnetic technique known as "shaded-pole" effect which relies on a difference in the phase angle of the magnetic flux to produce inward-traveling magnetic fields and consequent inward or restoring magnetic forces to effect lateral stability. The shaded-pole effect is created by use of a mixed-mu of magnetic materials i.e. the upper guideway member having $U_r=1$ and the lower guideway material having $U_r>>1$. The effect is extenuated by laterally displacing the two guideway materials to maximize the phase angle shift of the magnetic flux passing through the upper, conducting material. The resistivity and thickness of the conducting material of conductive strip 3 are essential design factors.

Figure 3:
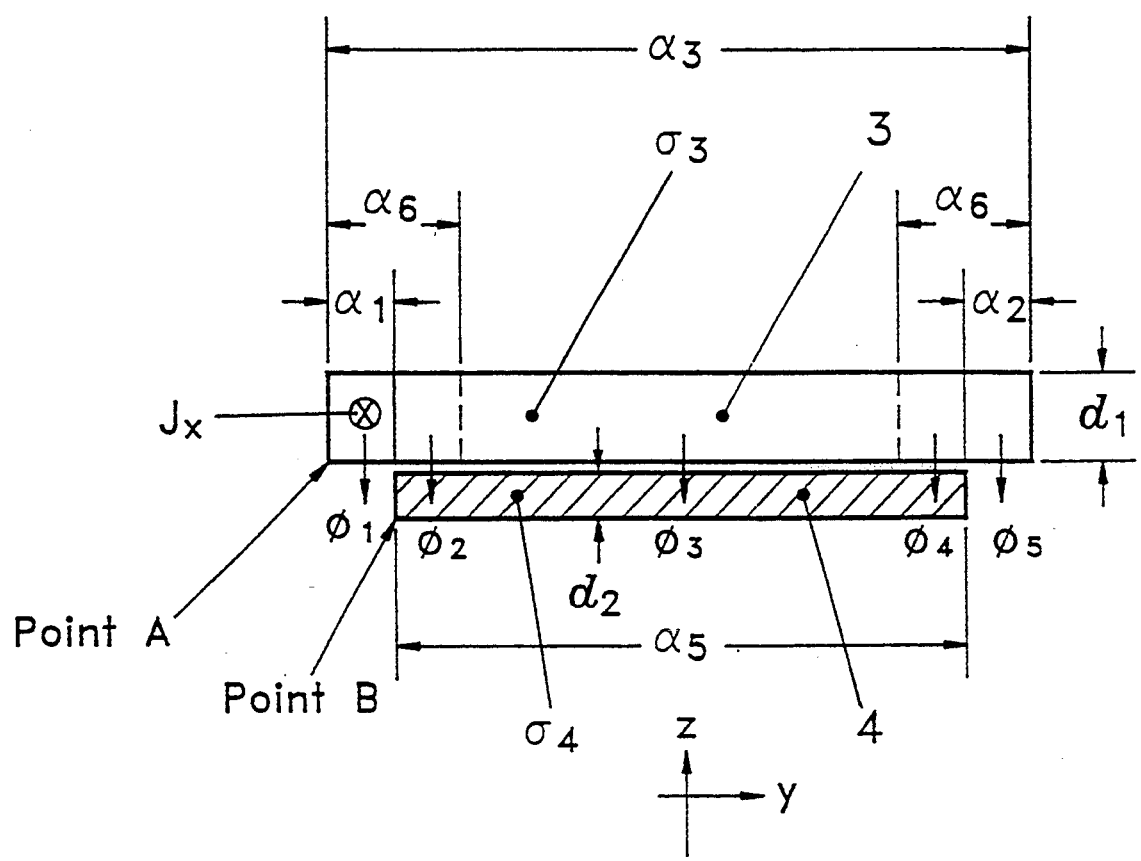
FIG. 3 is an end view of the levitation and guidance element.

FIG. 3 shows a view of the theoretical phase angle shift in magnetic flux which occurs in the vicinity of the upper and lower material edge boundaries over both low and high speed maglev vehicle conditions and independent of the exact magnitude of the vehicle generated magnetic flux, i.e. this is applicable to both high and low field maglev systems including use of high-temperature vehicle superconductors. Flux $\phi_1$ which penetrates the end of the sidebar conductor is advanced in time over flux $\phi_2$. Similarly $\phi_5$ is advanced in time over $\phi_4$. Flux $\phi_3$ is the main flux through the center loop area, which lags either $\phi_2$ or $\phi_4$ again causing an inward traveling field to exist.

There is a component of lateral force, $F_y$ contributed by the linear synchronous motor (LSM) used primarily for propulsion but with both lateral and levitation capacity. The field-to-stator reference phase mutual inductance peaks when their direct axes coincide, which by convention occurs when $\alpha = \pi/2$ and consequently the space derivative of $M_{fs}$ for phase $\phi$ in the propulsion direction (the case $u=x$) is:

$$\left.\frac{\partial M_{fs}(x,y,z)}{\partial x}\right|_{\phi=1,2,3} = \tag{1}$$

$$\frac{\pi M_{fs}(y,z)}{T_p} \sin\left(\frac{x}{T_p}\pi + (\phi-2)\frac{2\pi}{3} + \frac{\pi}{2}\right)$$

when, $M_{fs}(y,z)$=peak mutual inductance between one field coil and an LSM phase winding in the direction of the stator MMF traveling wave.

If the angular position of the vehicle field coil, $\alpha$, is known at all time for a desired value of current angle, $\beta$, the LSM stator current can be properly synchronized.

The nth harmonic component of the waveform, $I_{s\phi}$ can be expressed:

$$I_{s\phi}(\alpha,\beta) = \sum_{n=1,3,5}^{\infty} \frac{2\sqrt{2}}{\sqrt{3}}\frac{I_s}{n}\sin(n\pi/3)\sin[n(\alpha + \tag{2}$$

$$\beta + (\phi-2)2\pi/3)]\sin(n\pi/2)$$

to approximate the y and z variations.

$$M_{fs(y,x)} = M_{fso}e^{-(z-z_0)/k_1}\frac{\cos(y\pi/K_y)}{\cos(y_0\pi/K_y)} \tag{3}$$

using $$M_{fso} = M_{fs(y=y_0,z=z_0)} \tag{4}$$

$$k_1 = \left.\frac{F_{xo}}{\partial F_x/\partial z}\right|_{z=z_0} \tag{5}$$

= thrust attenuation constant for heave

-continued $K_y$ = thrust attenuation constant for sway.

The levitation force, $F_z$ produced by the LSM can be derived as shown in IEEE Transaction on Magnetics, Vol. MAG-13, Sept. 1977, pp. 1415—1418.

$$\left.\frac{\partial M_{fs}(x,y,z)}{\partial y}\right|_{\phi=1,2,3} = \tag{6}$$

$$\frac{-\pi}{K_2} M_{fso}e^{-(z-z_0)/K_1}\frac{\sin(y\pi/K_y)}{\cos(y_0\pi/K_y)}\cos\left(\frac{x}{T_p}\pi + \right.$$

$$\left. (\phi-2)\frac{2\pi}{3} + \frac{\pi}{3}\right)$$

Figure 4A:
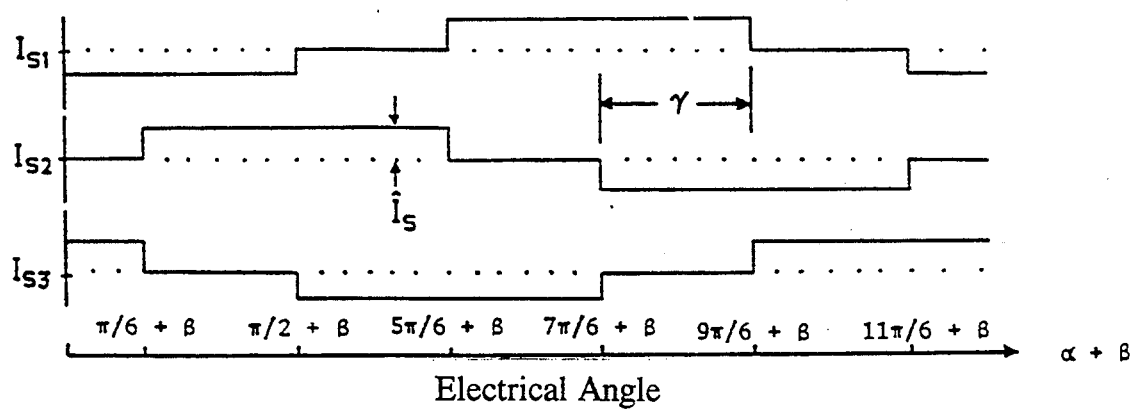
FIG. 4a is a graph of the square wave stator current timing.

Exciting the stator with the square-wave current distribution of FIG. 4a, the coupled circuit force model is represented by:

$$F_u = \sum_{\phi=1}^{\phi m} i_f I_{s\phi}(\alpha,\beta)\frac{\partial M_{fs}(x,y,z)_\phi}{\partial u} \tag{7}$$

where:

$i_f$=field magnet ampere-turns $I_{s\phi}(\alpha\beta)$=The square-wave stator current distribution as represented in FIG. 4a.

x=displacement between center of field coil and center of reference phase $\phi=2$ in the propulsion direction.

y=lateral displacement between field and stator center lines ($Y_o$=steady-state lateral displacement).

z=Levitation height ($z_o$=steady-state levitation height).

$M_{fs(x,y,z)}$=mutual inductance between one field coil at position (x,y,z) with respect to the center of a The instantaneous transverse force is:

$$F_y = F_{ym}\left[\cos\beta - \frac{1}{5}\cos(6\alpha + 5\beta) - \tag{8}\right.$$

$$\left.\frac{1}{7}\cos(6\alpha + 7\beta) + \frac{1}{11}\cos(12\alpha + 13\beta) + \ldots\right]$$

where $$F_{ym} = \frac{-3\sqrt{2}\,\pi\,I_s\,i_f M_{fso}}{2\,K_y}e - (z-z_0)/K_1\frac{\sin(y\pi/K_y)}{\cos(y_0\pi/K_y)} \tag{9}$$

Figure 4B:
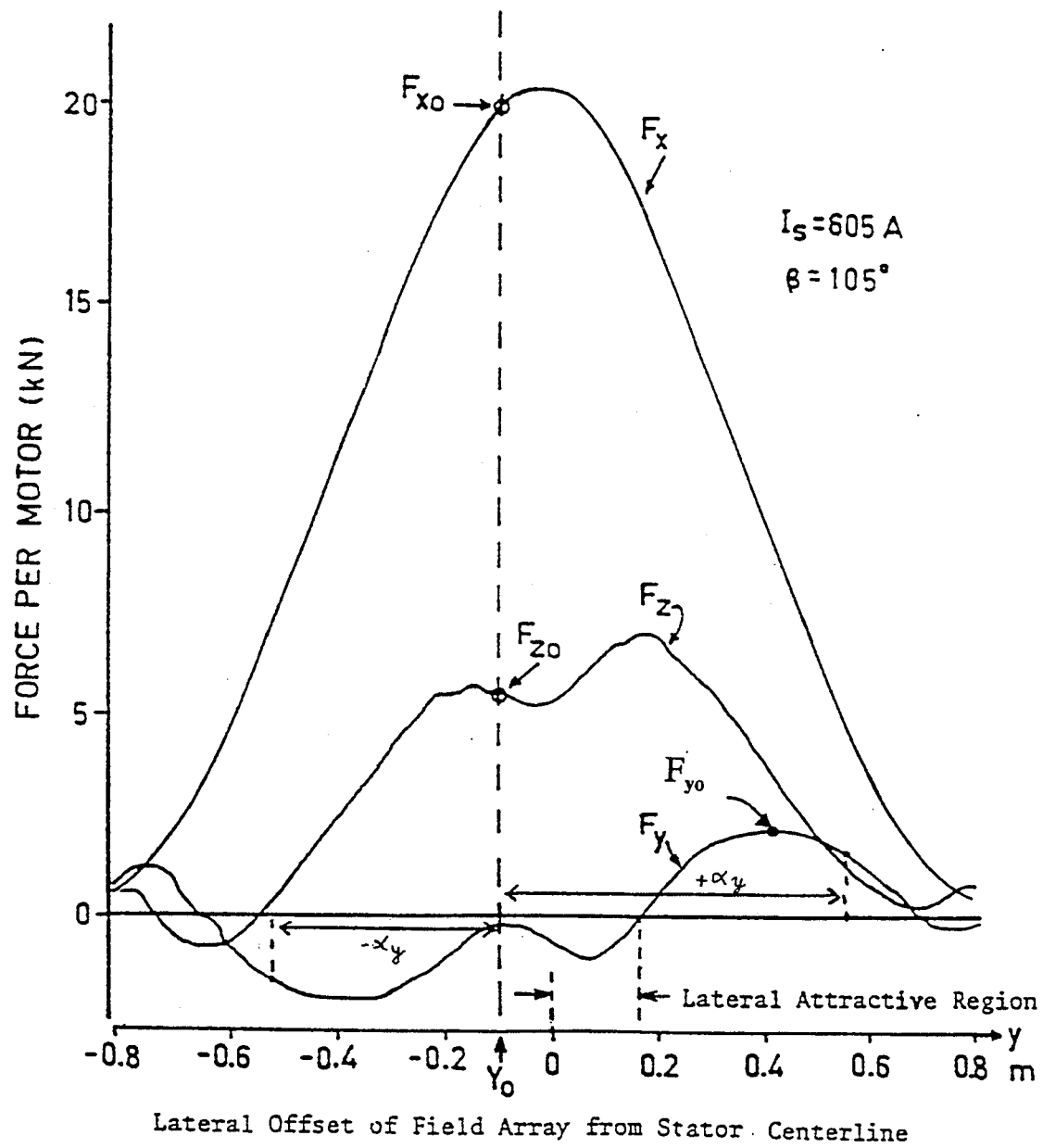
FIG. 4b is a graph of the propulsion, levitation and lateral forges with sinusoidal excitation.

The preferred embodiment of the patent is whereby the combination of material thicknesses, d1 and d2 and the position of the edge of ferromagnetic lower material Point B with respect to edge position A of the non-ferromagnetic upper material is unique and optimum to permit a phase angle between the two vertically directed flux components to be: $30° < \alpha < \phi_1 - < \phi_2 < 60°$.

i.e. a 30° to 60° phase angle is a necessary condition to realize a substantial inward traveling field and consequent lateral restoring force. As the distance $a_1$ or $a_2$ is decreased, the flux phase angle $\alpha$ will decrease and as well as the corresponding magnitude of the lateral restoring force. The force is self-centering and has a quasi-sinusoidal distribution of lateral force versus lateral displacement as shown in FIG. 4. Fyo is the maximum obtainable lateral force, and Fyd is the point at where the force drops to 70.7% of Fyo at a displacement $\alpha_y$. For the symmetrical case of $\alpha_1=\alpha_2$, the critical displacement is approximated by $\alpha_y=2\alpha_1$. In practice on large scale systems, a typical overlap dimension $\alpha_1=5$ cm.

The combined force of electrodynamic (repulsion) and electromagnetic (attractive) is described analytically by the expression for total force density as $$F = \frac{B^2}{2\mu_o} - \frac{J^2\mu_o}{4} \quad \text{in Newtons/sq. m.}$$

The first term represents the magnetic attraction force and is dependent on the square of the magnetic flux density B. The second term is the repulsion force and dependent on the square of the induced current loading J (not density) in the conducting member. In general, the first term applies to the lower ferromagnetic strip 4 and the second term applies exclusively to the upper, non-ferromagnetic conductive strip 3. When the net force is zero, it means that the system is in perfect equilibrium for there exists cancellation of attractive and repulsive forces. The equation must be applied to both sides of the plate. More important, is to define which components of B and J are applicable. For a lateral force to exist by ferromagnetic attraction, the useful component B must be in the lateral direction. However, for the repulsion force to be directed laterally, the current loading component $J_x$ must be in the longitudinal direction (x) as shown in FIG. 3, i.e.

$$F_{lateral}=B_{vertical(z)} \times J_{longitudinal(x)}$$

The shaded-pole effect compliments this interaction by producing the phase shift in the vertical (and lateral) components of vehicle-generated magnetic flux. In the preferred embodiment, the lower member is ferromagnetic with $U_r>>1$ but conductivity $\delta_4$ much lower than the conductivity $\delta_3$ of the conductive strip 3 which is typically aluminum or copper. If the lower member is highly conductive, this detracts from the preferred embodiment by reducing the shaded-pole phase shift and restoring force. In the preferred embodiment, the lower member can be a laminated ferromagnetic material to reduce the magnitude of induced eddy currents where in contrast, the upper surface should maximize the magnitude of eddy currents and the conductors are electrically connected.

The B-H curve of ferromagnetic structural steel such as AISI Grade 1020 indicates that fields below 1.8 Tesla are readily accommodated without exceeding the saturation flux density. The attenuation of the vehicle magnetic field must be such that by natural decrement due to airgap spacing the impinging flux density must be lower than the saturation flux density $B_{sat}$. In high field systems whereby the vehicle magnet operates above 5.0 Tesla and the track surface has greater than 2.0 Tesla, then high cobalt steels such as Hiperco-27, Supersil or Hiperco-50A must be used which have $B_{sat}=2.2$ Tesla.

The addition of a ferromagnetic plate underneath the main levitation ladder causes a higher flux density through the conducting strip 3 than would otherwise exist with the equivalent airgap, pole-pitch and field excitation level on the vehicle magnets. Further, the ferromagnetic strip 4 reduces the stray magnetic flux density below the plate to a virtual zero (<50 mT) field which is advantageous for environmental and human factors. The amount of shielding afforded by ferromagnetic strip 4 as well as the magnitude of the lateral shaded-pole effect is a strong function of plate thickness. The preferred embodiment operates the plate at 92% of its peak saturation density and thus the larger the maglev vehicle or higher the suspension force, the greater the EDS flux and the larger the ferromagnetic strip 4 size. In typical situations, the ferromagnetic strip 4 thickness is between 0.25 and 0.75 inch and the relative permeability is $U_r=2000$ to $U_r=4000$.

Figure 5:
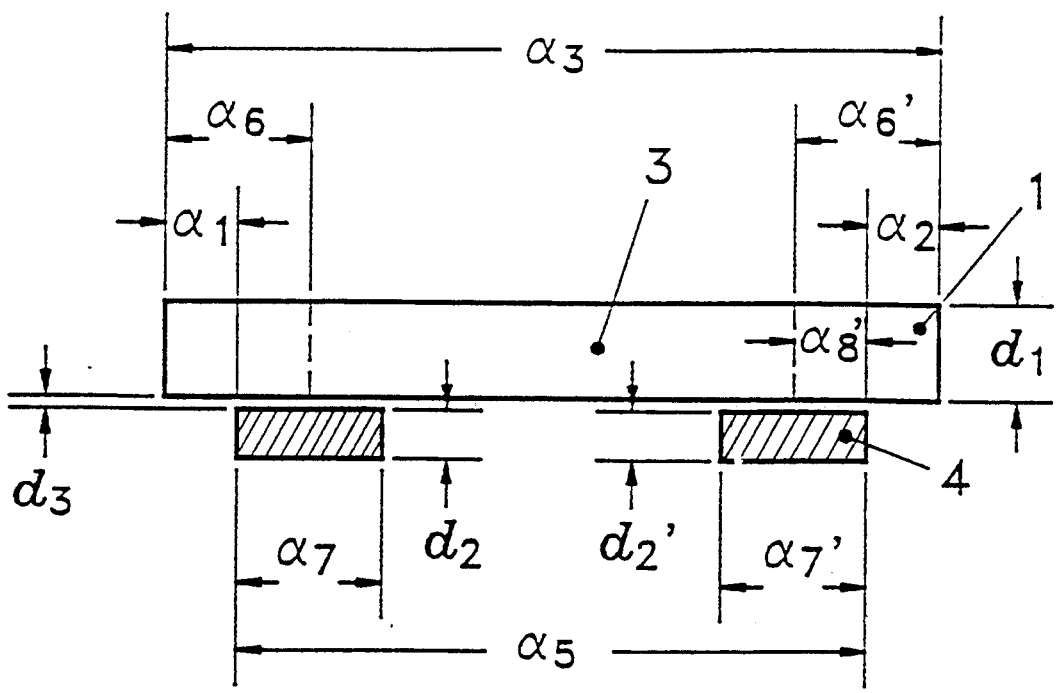
FIG. 5 is an end view of type A mixed-mu lateral stabilization with four edges shown in multiple priomagnetic plate scheme.

A secondary arrangement is described of the preferred embodiment whereby multiple edges of the ferromagnetic back plate are fitted to each side of the guideway. This has the effect of producing a multiplicity of inward traveling fields and thereby enhancing overall lateral stability. There is a limit as to how close the multiple edges may be spaced; in general the edges cannot be closer than a conducting ladder 3 sidebar thickness $\alpha_1$. FIG. 5 shows an arrangement consisting of 2 multiple edges per side noting that the ferromagnetic material is now omitted from the interior region to economize on materials but also to control the impinging flux path to be directed as highly as possible to the outer edges of ferromagnetic strip 4. The parameter $\alpha_7$ is the lateral dimension per side of each ferromagnetic strip 4 with the $\alpha_5$ parameter describing the overall lateral dimension per side of one pair. FIG. 5 is the specific case where the lateral offset of ferromagnetic strip 4 toward the center has this ferromagnetic piece positioned with 50% or greater of its surface area underneath the conducting ladder sidebar conductor 21 and the remainder of ferromagnetic strip 4 underneath conductive strip 3 which is either the open-zone (inactive) or the ladder rungs. This embodiment is hereby described as Type A wherein the majority of the ferromagnetic back plate is under active conductor area and the active offset dimension is termed $\alpha_8$. Mathematically we have $\alpha_8=\alpha_7+\alpha_2-\alpha_6$. The primed nomenclature $\alpha_7'$, $\alpha_8'$, $\alpha_6'$, along with $\alpha_2$ describe the case of an asymmetrical layout whereby the left and right side systems are different in lateral dimensioning to afford a negative bias of one side to help control vehicle lateral dynamics. Other than a change in lateral dimensions, the response of each side and the ability to effect phase changes in the flux is also dependent on design specification of the plate thickness $d_2'$ and the materials composition for $U_r$ and $\delta$. In the preferred embodiment, the materials properties for ferromagnetic strip 4 are retained to be identical as well as material thickness $d_2=d_2'$ and adjustment of lateral response, stiffness and damping accomplished by lateral positioning of the ferromagnetic strip 4.

Figure 6:
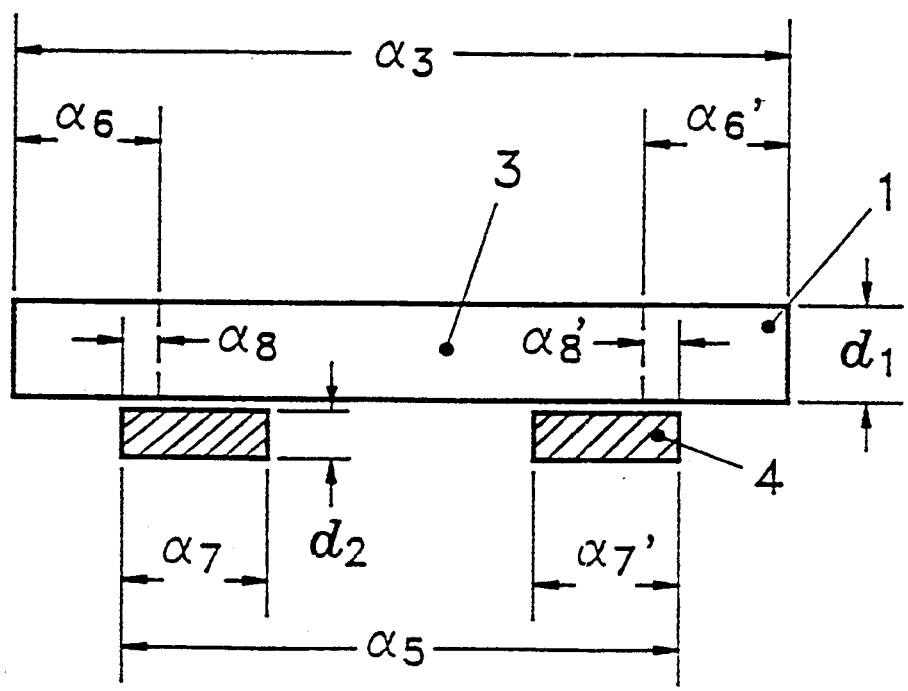
FIG. 6 is an end view of a type B mixed-mu lateral stabilization with four ferromagnetic edges and reduced dimension.

The other broad category termed Type B is where ferromagnetic strip 4 is moved closer inwards on each side to the point where less than 50% of its surface area is under the active ladder sidebar conductor Item 1 and thus different lateral response and different nature of phase shift occurs although producing high inward traveling fields. FIG. 6 shows this scheme of the Type B mixed-mu lateral stabilization with a multiplicity of lateral edges wherein $\alpha_8$ and $\alpha_8'$ are reduced with respect to FIG. 5 (Type A) and physically it is seen that $\alpha_8<\alpha_6$ and $\alpha_8'<\alpha_6'$. The vertical dimension $d_3$ the airgap separation between upper & lower members is to be minimized; the effect of enlarging $d_3$ is to define the system and reduce the phase shift of main flux.

There is an optimum offset $\alpha_2$ in both Type A and Type B systems specific to each vehicle magnet design, especially the magnet active width (lateral) and the height of the superconductor. The exact determination of key parameters such as $\alpha_2$, $\alpha_7$ and $\alpha_8$ requires a finite-element 3-dimensional field analysis in a magnetostatic frame. However, due to eddy current effects at high speeds (classified as a system exceeding 50 m/s linear speed) the magnetic wake of the vehicle and flux distribution in the airgap and on guideway surface is strongly influenced by the eddy current induction in the levitation ladder. In state of the art maglev systems, at high speed, the flux at the entry edge of the levitation magnets is reduced below nominal and at the exit edge and for 2 or greater pole-pitches in back of the vehicle the vertical component of flux density is higher than nominal including a "wake" effect. This is well understood with experimental documentation existing. However, less well understood is the lateral redistribution of the vertical and longitudinal ($B_z$ and $B_x$ respectively) flux density when at high speeds. In general, the effect of levitation eddy currents at high speeds will cause the field magnet originated flux to have a larger magnitude at points further and further disposed from the centerline of each levitation ladder center axis as speed progressively increases; i.e. the flux becomes more spread out and increasing the apparent stray field along the edges of the vehicle and guideway with prior art. The armature reaction of the levitation ladder becomes greater as speed increases so that there is a reduction in useful total flux despite constant field ampere-turns on the vehicle when single-mu levitation ladders are fitted.

The preferred embodiment described herein makes a significant improvement in overall levitation and lateral stabilization accounting for speed-induced differences in field magnet flux distribution. The Type A system with more outward positioned high-mu material lower plates is best suited for high and medium speed applications as it positions the strips 4 in a zone to specifically maximize vertical and longitudinal flux density and to reduce stray field along vehicle edges. The Type B system with inward positioned high-mu material, steel plates is best suited for slow speed ($<$50 m/s) causing the flux to concentrate into the smallest lateral area possible. Thus in a given maglev system, the optimum design incorporates Type A, Type B and a provision whereby $\alpha_8$ and $\alpha_8'$ dimensions are progressively increased as the guideway serves greater and greater speed corridors. The salient features of the design are flux concentration to increase the phase shift for shaded-pole action and to enhance the vertical component of flux density. Ancillary features to the P.E. are in reducing the otherwise large stray component of total magnetic flux alongside and underneath guideway by use of ferromagnetic flux concentrators 4.

Although the invention has been described in detail in the foregoing embodiments for the purpose of illustration, it is to be understood that such detail is solely for that purpose and that variations can be made therein by those skilled in the art without departing from the spirit and scope of the invention except as it may be described by the following claims.

What is claimed is:

1. An electrodynamic levitation system for moving from one location to another location comprising:
    a vehicle;
    a guideway along which the vehicle travels;
    propulsion means for moving the vehicle, at least a first portion of the propulsion means in contact with or suspended from the vehicle and at least a second portion in contact with the guideway; and
    means for controlling lateral guidance and vertical levitation of the vehicle with respect to the guideway as the vehicle travels longitudinally along the guideway, at least a first portion of the controlling means in contact with or suspended from the vehicle and at least a second portion is in contact with the guideway under the vehicle's travel, said second portion including a levitation and guidance element comprised of an electrically conductive non-ferromagnetic levitation and guidance strip and a ferromagnetic lateral guidance strip in mechanical contact with and in parallel with the levitation and guidance strip, said ferromagnetic lateral guidance strip positioned underneath the electrically conductive levitation and guidance strip so the electrically conductive levitation and guidance strip is between the ferromagnetic lateral guidance strip and the first portion which is in contact with the vehicle.

2. A system as described in claim 1 wherein the first portion includes at least one primary coil operated so as to establish a magnetomotive force and consequent airgap magnetic flux between said first and second portions.

3. A system as described in claim 2 wherein the field coil produces a primary magnetic flux which is phase shifted as a function of vehicle speed by the levitation and guidance elements on the guideway, thereby establishing a lateral magnetic gradient with consequent inward-traveling magnetic fields for creating a lateral restoring force.

4. A system as described in claim 3 wherein the ferromagnetic lateral guidance strip is laterally offset from the levitation and guidance strip a varied amount corresponding to speed of the vehicle as it travels along the guideway, which produces a laterally-directed restoring force which aligns the vehicle over the guideway and produces a high stabilizing lateral acceleration and force.

5. A levitation and guidance element of a guideway in which an electrodynamically suspended maglev vehicle travels comprising:
    an electrically conductive levitation and guidance strip; and
    a ferromagnetic lateral guidance strip in contact with and in parallel with the levitation and guidance strip with the electrically conductive levitation and guidance strip positioned between the ferromagnetic lateral guidance strip and the vehicle during operation, wherein the thickness of ferromagnetic lateral guidance strip is sized to yield a permeability of between 2,000 and 4,000 for the magnetic flux cutting the electrically conductive levitation and guidance strip.

6. An element as described in claim 5 wherein the levitation and guidance strip has a width, and the lateral guidance strip has a width which is less than the width of the levitation and guidance strip.

* * * * *